United States Patent [19]
Rigal et al.

[11] Patent Number: 5,483,797
[45] Date of Patent: Jan. 16, 1996

[54] METHOD OF AND APPARATUS FOR CONTROLLING THE OPERATION OF A VALVE THAT REGULATES THE FLOW OF GEOTHERMAL FLUID

[75] Inventors: Meir Rigal, Doar Na Avtah; Amir Karas, Yavne; Aba Nathan, Kiriat Ono; Yechiel Rifner, Holon; Naday Amir, Rehovit; Lucien Y. Bronicki, Yavne; Moshe Grassianni, Herzeiya, all of Israel

[73] Assignee: Ormat Industries Ltd., Yavne, Israel

[21] Appl. No.: 80,816

[22] Filed: Jun. 24, 1993

Related U.S. Application Data

[63] Continuation-in-part of Ser. No. 989,918, Dec. 11, 1992, abandoned, which is a continuation of Ser. No. 730,526, Jul. 15, 1991, abandoned, which is a continuation of Ser. No. 444,565, Dec. 1, 1989, abandoned.

[30] Foreign Application Priority Data

Dec. 2, 1988 [IL] Israel .......................................... 088571

[51] Int. Cl.$^6$ ....................................................... F03G 7/00
[52] U.S. Cl. ............................ 60/641.2; 60/641.5; 60/662
[58] Field of Search ................................ 60/641.2, 641.3, 60/641.4, 641.5, 660, 662; 290/40 R, 40 C

[56] References Cited

U.S. PATENT DOCUMENTS

| | | | |
|---|---|---|---|
| 4,249,385 | 2/1981 | Bissell | 60/660 X |
| 4,484,446 | 11/1984 | Goldsberry | 60/660 X |
| 4,542,625 | 9/1985 | Bronicki | 60/641.2 |

FOREIGN PATENT DOCUMENTS

| | | |
|---|---|---|
| 0188219 | 11/1966 | U.S.S.R. |
| 0556230 | 5/1977 | U.S.S.R. |
| 0585300 | 12/1977 | U.S.S.R. |
| 0630441 | 9/1978 | U.S.S.R. |
| 0646070 | 2/1979 | U.S.S.R. |
| 0646071 | 2/1979 | U.S.S.R. |
| 1101562 | 7/1984 | U.S.S.R. |

OTHER PUBLICATIONS

V. Y. Ruzhkin, "Steam Power Plants", Eneriya Publishers, 1967, pp. 207, 242, 243 and 249 and an English language Translation.

V. Y. Ruzhkin, "Thermal Power Stations", Eneriya Publishers, 1967, pp. 190–193, 200–201, 210–211 and an English Language Translation.

*Primary Examiner*—Stephen F. Husar

[57] ABSTRACT

The present invention provides a method of and apparatus for controlling the operation of a valve that regulates the flow of geothermal fluid that comprises geothermal brine and steam flowing through the valve to a geothermal plant. The method includes determining the maximum permitted value of at least one parameter or quantity affecting the operation of the geothermal plant, and setting a predetermined value for the at least one quantity which is less than the maximum value of the quantity. The flow of fluid through the valve is reduced when the value of said at least one quantity reaches its preset value for maintaining the operation of the geothermal plant.

11 Claims, 6 Drawing Sheets

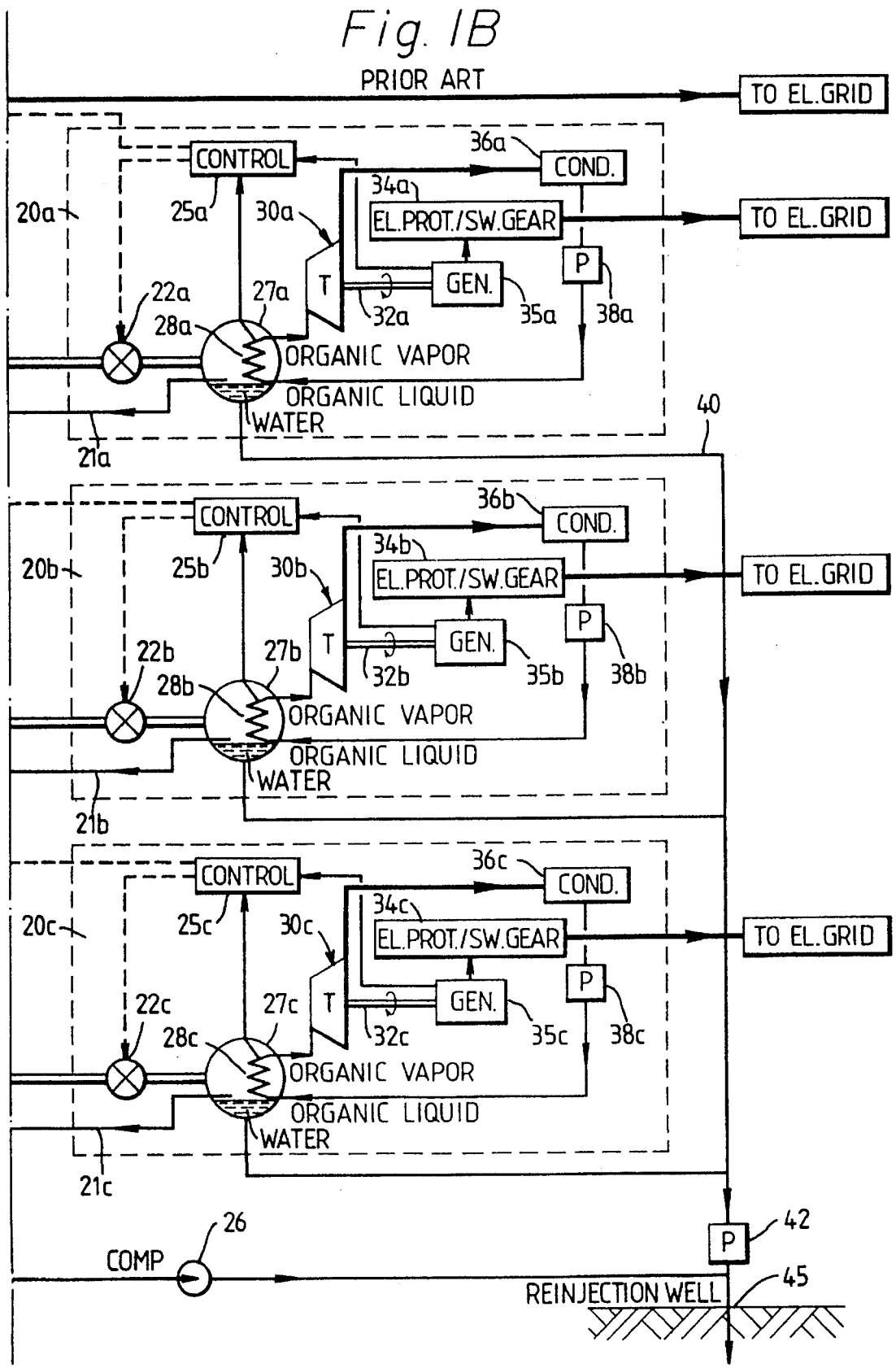

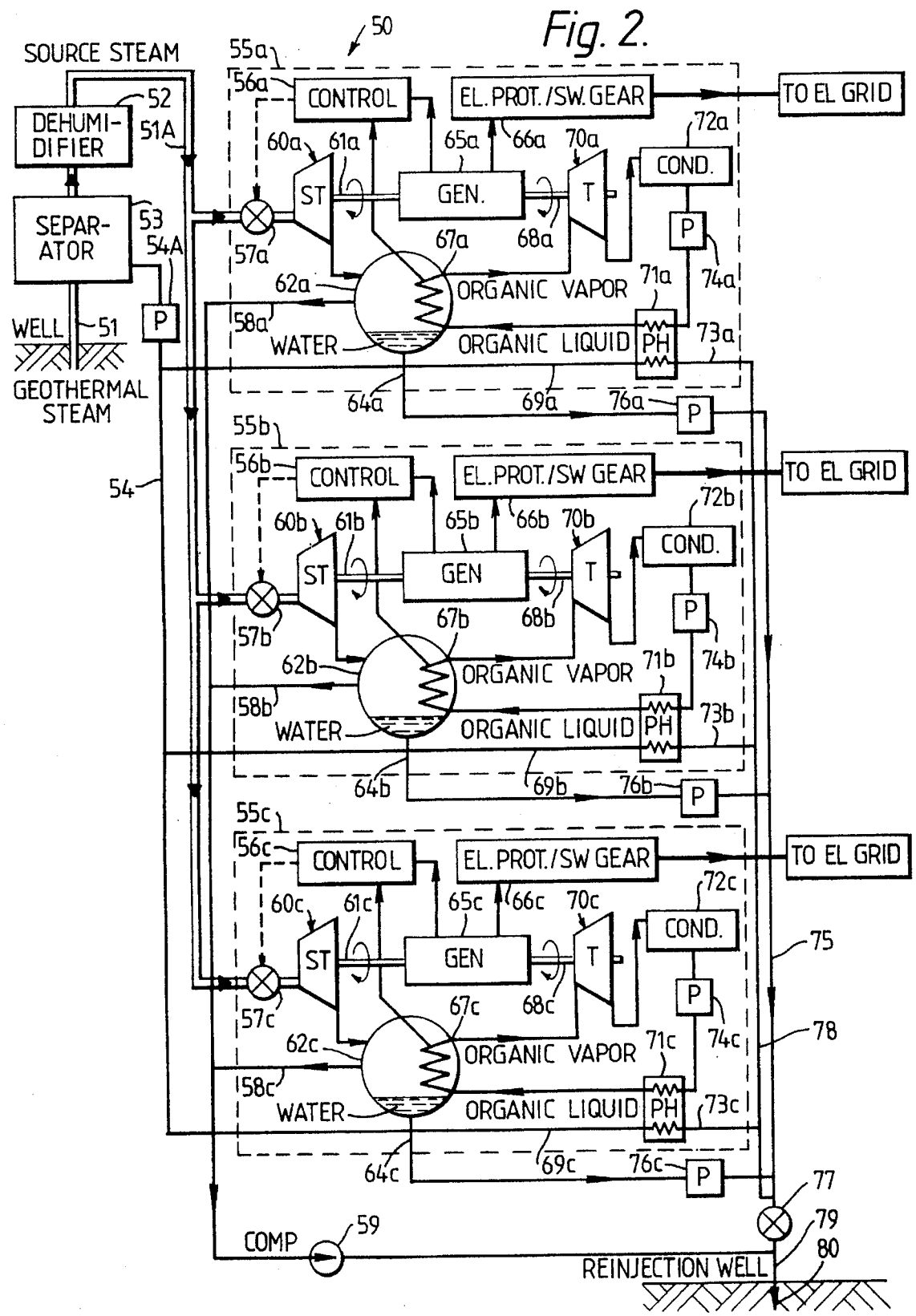

AUTOMATIC OVERRIDES

| VALVE DESCRIPTION | OVERRIDE DEFINITION | MODULE NO. | | | | |
|---|---|---|---|---|---|---|
| | | 1 | 2 | 3 | 4 | 5 |
| STEAM TURBINE CONTROL VALVE (158) | ORGANIC CONDENSER HIGH PRESSURE<br>STEAM TURBINE POWER LIMIT<br>LOCAL NCG | —<br>—<br>— | —<br>—<br>— | —<br>—<br>— | —<br>—<br>— | —<br>—<br>— |
| STEAM TURBINE BY-PASS VALVE (171) | MAIN STEAM PRESSURE<br>STEAM TURBINE BACK PRESSURE<br>CONDENSER HIGH PRESSURE | —<br>—<br>— | —<br>—<br>— | —<br>—<br>— | —<br>—<br>— | —<br>—<br>— |
| ORGANIC TURBINE BY-PASS VALVE (188) | ORGANIC TURBINE POWER LIMIT<br>ORGANIC CONDENSER HIGH PRESSURE<br>VAPORIZER HIGH PRESSURE<br>LOCAL NCG | —<br>—<br>—<br>— | —<br>—<br>—<br>— | —<br>—<br>—<br>— | —<br>—<br>—<br>— | —<br>—<br>—<br>— |
| ORGANIC TURBINE MAIN VALVE (190) | LOCAL NCG | —<br>—<br>— | —<br>— | —<br>— | —<br>—<br>— | —<br>—<br>— |
| NOZZEL VALVE | STEAM TURBINE BACK PRESSURE | — | — | — | — | — |

FIG. 2B

METHOD OF AND APPARATUS FOR CONTROLLING THE OPERATION OF A VALVE THAT REGULATES THE FLOW OF GEOTHERMAL FLUID

RELATED APPLICATIONS

This application is a continuation-in-part of copending application Ser. No. 07/989,918 filed Dec. 11, 1992, now abandoned which is a continuation of application Ser. No. 07/730,526 filed Jul. 15, 1991, now abandoned, which is itself a continuation of application Ser. No. 07/444,565 filed Dec. 1, 1989, now abandoned. The subject matter of application Ser. No. 07/989,918 is hereby incorporated by reference.

TECHNICAL FIELD

This invention relates to producing power from steam and more particularly is concerned with a method of and apparatus for producing electric power from geothermal fluids using integrated units.

BACKGROUND OF THE INVENTION

Steam has been used for many years in the production of electric power. In particular, geothermal sources of steam have increasingly been utilized in recent times as sources of energy. Conventionally, steam turbines are used to convert geothermal steam exiting wells into electric power.

Recently, more extensive use of this source of energy has been achieved by using closed organic Rankine cycle turbines and quite often, a combination of steam turbines and closed organic Rankine cycle turbines has been used in the production of power from these geothermal sources which many times contain non-condensable gases, for example carbon dioxide, hydrogen sulfide, etc., detrimental to the environment. Such a system is disclosed in U.S. Pat. No. 4,542,625, the disclosure of which is hereby incorporated by reference, where a steam condenser operating at pressure greater than atmospheric pressure is used to condense heat depleted steam exiting a steam turbine and collect the noncondensable gases by applying an organic fluid which is vaporized for use in running a closed organic cycle Rankine turbine. Subsequently, the condensate together with the non-condensable gases having been compressed are pumped back into a reinjection well rather than exhausting the gases into the free atmosphere. In such cases, it has been conventional to use one or more large steam turbines to produce power from the geothermal steam exiting the wells with a larger number of separate closed organic Rankine cycle turbines operating on the heat depleted steam exiting the steam turbines. A power plant of this type thus requires a rather extensive and costly distribution system having large diameter conduits for supplying the low pressure, heat depleted steam exiting the steam turbines to the closed organic cycle Rankine turbines and a reasonably sophisticated control system, since for example, the heat depleted steam must be handled even in the case of malfunction or closing down of one or more of the organic Rankine turbines. Furthermore, the malfunction or closing down of one or more of the organic Rankine turbines or even the reduction of the output of one or more of the organic Rankine turbines also normally causes a reduction in the operating efficiency of the steam turbines as the organic fluid acts as the cooling fluid of the steam condensers.

It is therefore an object of the present invention to provide a new and improved method of and apparatus for producing power from steam wherein the disadvantages as outlined are reduced or substantially overcome.

SUMMARY OF THE INVENTION

The present invention provides a method of and apparatus for controlling the operation of a valve that regulates the flow of geothermal fluid that comprises geothermal brine and steam flowing through the valve to a geothermal plant. The method includes determining the maximum permitted value of at least one parameter or quantity affecting the operation of the geothermal plant, and setting a predetermined value for the at least one quantity which is less than the maximum value of the quantity. The flow of fluid through the valve is reduced when the value of said at least one quantity reaches its preset value for maintaining the operation of the geothermal plant.

BRIEF DESCRIPTION OF THE DRAWINGS

Embodiments of the invention are described below by way of example, and with reference to the accompanying drawings wherein:

FIG. 1A and 1B represents a prior art geothermal power plant;

FIG. 2 shows a schematic block diagram of a geothermal power plant according to the present invention;

FIG. 2B is a schematic showing of the computer display screen by which an operator monitors the embodiment of FIG. 2A.

DETAILED DESCRIPTION

Figure 1A:
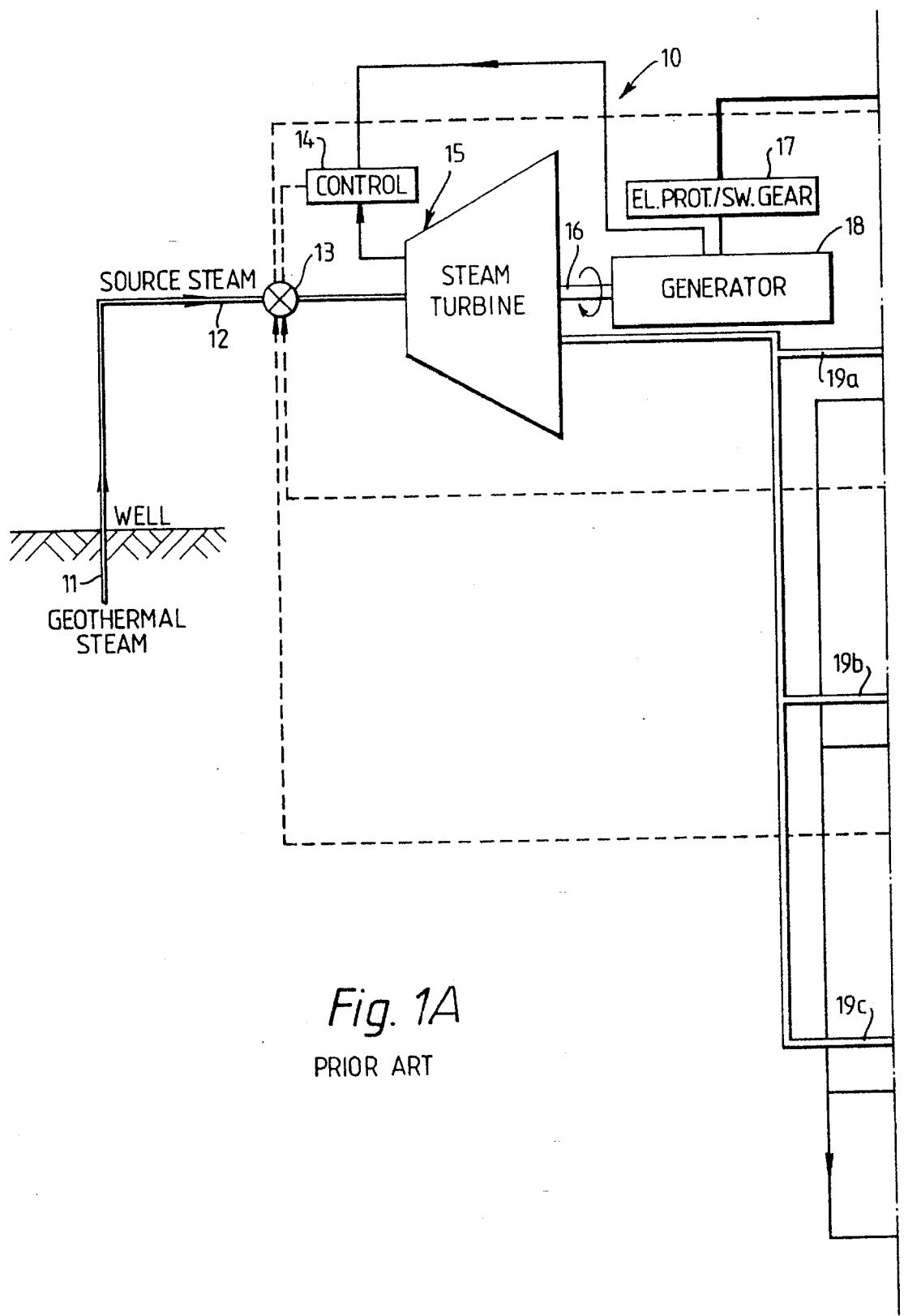

Referring now to the drawings, reference numeral 10 in FIGS. 1A and 1B represent an example of a conventional geothermal power plant for generating electric power from geothermal steam, wherein steam from well 11 flows via conduit 12 and control valve 13 to steam turbine 15. The turbine extracts work from the steam and drives generator 18 provided to supply electric power to the electric grid via electric protection sub-system 17 using control 14. Usually electric protection sub-system 17 includes circuit breakers and other protection means. Also switch gears are used. Exhaust distribution conduits 19a, 19b and 19c are provided for supplying heat depleted steam exiting steam turbine 15 to steam condensers 27a, 27b, 27c using control valves 22a, 22b and 22c, controlled by controls 25a, 25b and 25c contained in closed organic Rankine Cycle (ORC) power plant modules 20a, 20b, 20c respectively. Since the steam applied to the power plant modules is heat depleted steam exhausting steam turbine 15 its pressure is relatively low, pressures of 25 psia being common, and consequently, the diameter of conduits 19a, 19b and 19c is relatively large, e.g., approximately 140 cm, with valves 22a, 22b and 22c also being large in size making such installations quite expensive.

Steam condensers 27a, 27b, 27c are preferably operated at above atmospheric pressures to facilitate the extraction of non-condensable gases contained in the steam from the system via compressor 26, with the condensate produced by the steam condensers and compressed gases being piped into reinjection well 45 using pump 42. Coils 28a, 28b, 28c present in steam condensers 27a, 27b and 27c containing organic fluid used to cool the condensers also operate as vaporizers of the organic working fluid of the ORC power plant modules, with the vaporized organic fluid produced in coils 28a, 28b, 28c being applied to vapor turbines 30a, 30b, and 30c drive generators 35a, 35b, and 35c provided for producing electric power supplied via switch gear and electric production sub-systems 34a, 34b and 34c to the electric grid.

Organic working fluid vapors exiting turbines 30a, 30b, 30c are applied to organic working fluid condensers 36a, 36b and 36c where condensation takes place, the condensed organic fluid being returned by pumps 38a, 38b and 38c to vaporizer coils 28a, 28b and 28c completing the organic fluid cycle. Cooling water contained in cooling water means (not shown) can be used to cool these condensers, or, if preferred, air supplied by forced draft air cooling means (not shown), can be used to cool the condensers.

Module controls 25a, 25b and 25c, provided for controlling the amount of heat depleted steam reaching power plant modules 20a, 20b, and 20c, govern the degree of opening of control valves 22a, 22b and 22c in accordance with the monitored power produced by generators 35a, 35b and 35c and/or pressure in vaporized coils 28a, 28b and 28c. In addition, these controls provide control of the amount of source steam reaching steam turbine 15 via control valve 13. Thus, for example, if less electric power is to be supplied to the electric grid, the controls send a signal to control valves 22a, 22b and 22c to reduce their degree of opening, causing a decrease in the amount of heat depleted steam supplied to steam condensers 27a, 27b and 27c and thus decreasing the pressure in vaporizer coils 28a, 28b and 28c. Consequently, the output of organic vapor turbines 30a, 30b and 30c and their associated generators is reduced.

In this case, the controls will also appropriately reduce the quantity of source steam reaching steam turbine 15 by bringing about an adjustment in the opening of control valve 13, reducing its operating pressure and thus also reducing the output of the steam turbine. This is due to the fact that the organic working fluid contained in each of the organic Rankine cycle turbine modules acts as the cooling medium of the steam condensers of steam turbine 15. Furthermore, if one of the ORC power plant modules malfunctions, for example 20a, and is to be close down, then control 25a will close control valve 22a and also consequently bring about an appropriate adjustment to valve 13, causing a change in the amount of source steam reaching steam turbine 15, also making this turbine operate at a pressure different from its nominal value at a thus lower efficiency level.

Turning to FIG. 2, numeral 50 designates apparatus, according to the present invention for producing power from steam wherein distribution conduit 51A is provided for supplying geothermal steam originating from well 51 in parallel to steam turbines contained in a plurality of integrated power plant unit modules, three of such modules 55a, 55b and 55c being shown. However, the present invention can also be applied to one power plant module, separator 53 can be provided for separating hot geothermal liquid from steam contained in geothermal fluid exiting well 51, while dehumidifier 52 can be used to ensure that the moisture level in the steam is kept to a minimum. Source steam pressures of approximately 150 psia are common. Here, for convenience, we refer to power plant unit module 55a containing steam control valve 57a and steam turbine 60a for receiving the source steam and producing work therefrom by driving electric generator 65a via shaft 61a, the steam expanding in turbine 60B. The operation of valve 57a is controlled by control 56a.

Steam condenser 62a, which preferably operates at pressures greater than atmospheric pressure facilitating the separation of non-condensable gases contained in the steam, is provided for condensing heat depleted steam exiting steam turbine 60a by cooling the seam with organic fluid applied to the condenser in coil 67a contained therein. Such an arrangement avoids the necessity for use of vacuum pumps. Compressor 59 is provided for compressing the non-condensable gases present in steam condenser 62a the compressed gases flowing into exit conduit 79 located downstream from valve 77 where, together with condensate produced by the condenser and existing booster pump 76a, they are piped to reinjection well 80. Coil 67a also operates as a vaporizer of a closed organic Rankine cycle turbine, the organic working fluid contained in the coil being vaporized, with the vaporized fluid being applied to organic vapor turbine 70a where it expands and produces useful work by preferably also driving electric generator 65a via shaft 68a. An example of a suitable closed organic Rankine cycle turbine is disclosed in U.S. Pat. No. 3,409,782, the disclosure of which is hereby incorporated by reference.

Preheater 71a can be provided so that hot geothermal liquid exiting separator 53 via booster pump 54A may preheat the organic fluid before it is supplied to coil 67A. Heat depleted geothermal liquid exiting preheater 71a preferably flows via conduit 78 to valve 77 for reinjection at well 80 via exit conduit 79. Valve 77 assists in maintaining relatively high pressures in conduit 54 and in the conduits connecting preheater 71a to pump 54A as well as in the conduits connected to the outlet of the preheater so that flashing of the brine flowing in these conduits is substantially eliminated.

Preferably, pentane is used as the organic working fluid. However, other organic fluids such as Freons, etc., can be used. Preferably electric generator 65a is oversized compared to the capacities of steam turbine 60a and organic vapor turbine 70a, its generating capacity being preferably equal to the sum of the individual capacities of the stream turbine and vapor turbine For examples the capacity of steam turbine 60a may be 1.5 MW with the capacity of organic vapor turbine 70a also being 1.5 MW, the capacity of generator 65a being in such case 3 MW, permitting the simultaneous operation of both the steam and vapor turbines at full capacity. Although not shown, if preferred, clutches positioned on shafts 61a and 68a between the generator and steam and vapor turbines respectively can be provided with separate electric generators also being provided when preferred. Organic fluid condenser 72a is provided for condensing organic vapor exiting vapor turbine 70a, the condenser being cooled by air supplied via forced air draft means or if preferred, by cooling water supplied to the condenser through suitable means. Pump 74a returns condensed organic fluid to coil 67a completing the organic fluid cycle. Power plant 50 is thus a hybrid power plant comprising a portion which operates on geothermal steam and a portion operating on an organic fluid.

Thus, as can be seen from FIG. 2, when apparatus 50 is operated, steam originating from well 51, supplied via conduit 51A after exiting separator 53 and dehumidifier 52, is distributed to the various power plant unit modules by operating steam control valves 57a, 57b and 57c controlled by controls 56a, 56b and 56c. Since the steam is distributed to the power plant unit modules at pressures comparable with those of the source steam at the well 51, rather than at relatively low steam turbine exit pressures as is the case in conventional use, an example of which is shown in FIG. 1, the diameter of the distribution conduit is relatively small, e.g., approximately 50 cm when a pressure of around 150 psia is used. Furthermore, due to this, the size of control valves 57a, 57b and 57c is also relatively small, thus bringing about considerable savings.

Steam reaching steam turbines 60a, 60b and 60c expands, does work and electric power is produced wherein shafts 61a, 61b and 61c drive electric generators 65a, 65b and 65c. Heat depleted steam exhausting turbines 60a, 60b and 60c is supplied to steam condensers 62a, 62b and 62c where it condenses, the condensate and non-condensable gases collected in the steam condensers being reinjected into well 80 wherein the condensate flows via conduit 75 using booster pumps 76a, 76b and 76c, while the non-condensable gases are compressed by compressor 59. Vaporized organic working fluid, produced in coils 67a, 67b and 67c after being heated in preheaters 71a, 71b and 71c by hot liquid exiting separator 53 is furnished to vapor turbines 70a, 70b and 70c where it expands, causing the turbines to rotate, their output also being applied to electric generators 65a, 65b and 65c which furnishes the electric power generated to the electric grid via protection circuits and appropriate switch gears. Thus, organic vapor turbines 70a, 70b and 70c also contribute to the generating capacity of generators 65a, 65b and 65c, the shared electric generators and electric components such as shared switch gears providing improved economy and also greater convenience of operation. Heat depleted organic vapors exiting turbines 70a, 70b and 70c are applied to organic fluid condensers 72a, 72b and 72c where they condense, the condensate produced being supplied to vaporizer coils 67a, 67b and 67c, respectively using pumps 74a, 74b and 74c. Geothermal liquid exiting preheaters 71a, 71b and 71c is combined with condensate exiting booster pumps 76a, 76b and 76c using combining means for disposal into reinjection well 80 via valve 77.

In the embodiment shown in FIG. 2, controls 56a, 56b and 56c control the level of electric power generated by the modules by monitoring the power level of the generators 65a, 65b and 65c and the pressure in vaporizer coils 67a, 67b and 67c and accordingly controlling the amount of steam supplied to the power plant unit modules using steam control valves 57a, 57b and 57c. For example, in normal operation, if the controls indicate that less current is to be supplied to the electric grid, the amount of source steam applied to only one power plant module, for example 55a, can b reduced by appropriately adjusting its control valve, causing less power to be supplied by this module to the electric grid while permitting the other power plant modules to continue operating at their nominal values, maintaining their efficiency levels.

Thus, in such a case, in module 55a, control 56a causes a decrease in the degree of opening of control valve 57a, permitting a smaller quantity of source steam to be supplied to steam turbine 60a, with steam condenser 62a consequently bringing about a reduction in the operating pressure of vaporizer coil 67a, causing a reduction in the work produced by vapor turbine 70a and steam turbine 60a with the power level generated by generator 65a consequently decreasing. Also, if one of the unit modules is not in operation due to malfunction or maintenance procedures, etc., the control of the module not operating will simply close its control valve with the other module continuing to operate at their nominal values. Consequently, also here high efficiency levels will be maintained in the steam turbines contained in the other unit modules during their continued operation. This is in contrast with the conventional power plants, an example of which is shown in Fig, 1, where the closing down of one of modules 20a, 20b or 20c will also bring about reduction in the amount of steam supplied to steam turbine 15 in FIG. 1 via the partial closing of steam valve 13, causing the operating pressure of the steam turbine to change from its normal value and consequently reducing its efficiency level, Thus, in the present invention, by including a steam turbine together with a closed organic Rankine cycle turbine and preferably a single electric generator in each power plant module, relatively high efficiency operating levels, improved economy and also simpler control of the power producing apparatus are achieved wherein only one steam control valve per module is present, eliminating the need for separate control valves for the steam turbine and organic Rankine cycle turbine[s] as was the case in the prior art. Also, the presence of a steam turbine together with a closed organic Rankine cycle turbine integrated into each power plant module makes the construction of such power plants and their maintenance more convenient.

The present invention saves, for example, the construction of a large bay for housing a steam turbine were constructed out in accordance with conventional prior art. Furthermore, if preferred, in a particular embodiment, pumps 74a, 74b and 74c, can also be mounted a common shaft with the steam and organic turbines, permitting the automatic start up of the ORC turbines. If preferable, in the present invention the modules can remain on hot stand-by supplying the generated electricity to auxiliaries, enabling them to be connected to the electric grid almost immediately when called upon.

Figure 2A:
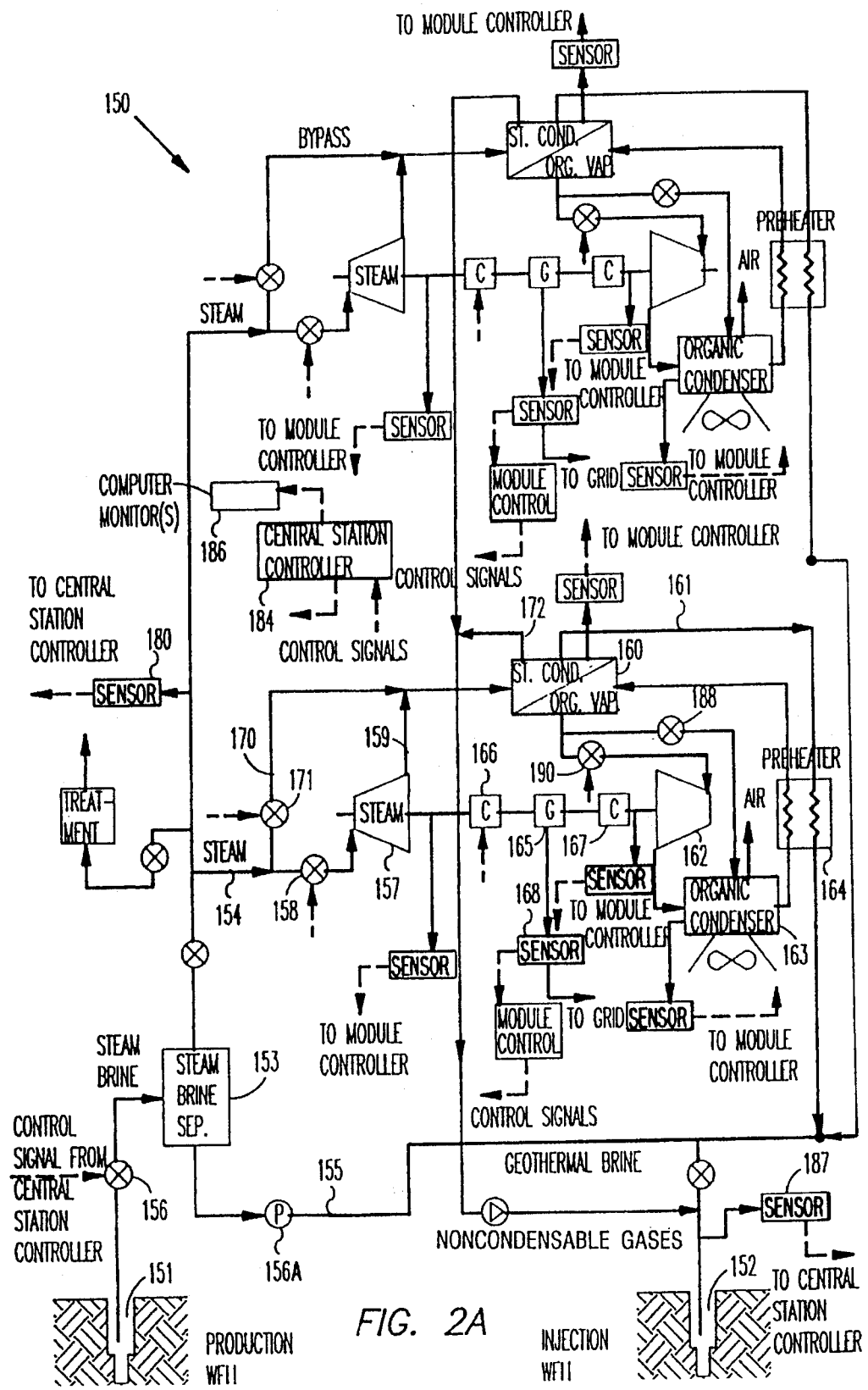
FIG. 2A is an embodiment of the invention dealing with the control of the mass flow to the power plant.

Another embodiment of the present invention, presently considered to be the best mode for carrying out the invention, is shown in FIG. 2A which depicts a geothermal power plant having two or more power plant modules similar to those disclosed in FIG. 2. In the embodiment shown in FIG. 2A, as well as in the apparatus disclosed in FIG. 2, a single generator driven by a pair of turbines is utilized.

The operation of the power plant system shown in FIG. 2A is sufficiently described with relation to FIG. 2. Briefly, geothermal power plant 50 includes production well 151 and injection well 152. The geothermal fluid produced by production well 151, comprising a mixture of steam and brine, is applied via plant pressure control valve 156, to steam/brine separator 53 which produces vapor stream 154 containing steam, and liquid stream 155 containing hot geothermal brine. Often, the pressure of the geothermal fluid produced by production well 151 is high, e.g., even as high as 1,000 to 2,000 psia. Pressure control valve 156 reduces the pressure of the fluid to a lower pressure, e.g., 300 psia suitable for the design pressure of the piping exiting valve 156. Because the brine from the separator cools as it is piped to injection well 152, pump 156A may be utilized for the purpose of pressuring the brine and preventing minerals in this stream from precipitating before the brine reaches the injection well.

Power plant 150 is shown as comprising two modules, but this is for the purpose of illustration only, it being understood that many modules would be used in a complete power plant. Each module is identical so that only one module is described. As shown in FIG. 2A, each module includes steam turbine 157 having throttle input 158 for receiving steam in stream 154. Turbine 157 operates in a conventional manner on the steam producing work and exhaust steam in exhaust line 159. Steam condenser 160 is provided for the purpose of cooling the exhaust steam in line 159 and producing condensate which flows in condensate line 161 to injection well 152. A pump (not shown) may be provided for pressurizing the condensate sufficiently to force the same into the injection well. Prior to injection of the condensate into the well, the condensate is combined with the geothermal brine and serves to reduce the concentration of the brine and further inhibit precipitation in the piping leading to the injection well.

Condenser 160 is cooled with an organic fluid, such as pentane, which is vaporized in condenser 160 and is applied to organic fluid turbine 162, where the vapor expands and produces work and organic vapor exhausted from turbine 162 is applied to condenser 163. Preferably, condenser 163 is an air cooled condenser which condenses the heat depleted organic vapor and supplies the condensate to steam condenser 160.

The steam turbine and organic turbine are contained in power plant modules as shown in FIG. 2A. A single generator, indicated by reference numeral 165, is provided. Generator 165 can be coupled via selectively Operable couplings 166 and 167, or other suitable couplings, to steam turbine 157 and organic vapor turbine 16, respectively. The selectively operable clutches are individually operable, either manually, to automatically for the purpose of selectively connecting either or both of the turbines to generator 165.

The output of the generator is applied to an electrical grid through sensor 168 which is effective to monitor the load on the generator. Sensor 168, together with the other sensors, is effective to control throttle input 158 of steam turbine 157 as explained below.

Power plant 150 further includes bypass means 170 in the form of suitable piping that permits throttle input 158 and turbine 157 to be bypassed when valve 171 is opened and throttle input 158 is closed. In this manner, steam in the vapor stream can be applied directly to condenser 160 during periods of relatively low load or maintenance of turbine 157. This arrangement ensures continuous operation of production well 151.

Finally, non-condensable gases in the steam exhausted by turbine 157 are vented from condenser 160 at 172. These gases may be compressed and piped to injection well 152. In addition, in order to reduce leakage of non-condensable gases (including hydrogen sulfide) from the system to a negligible level, a suction line in provided for extracting these gases from the steam turbine seal region. These extracted gases are preferably disposed of using conventional chemical abatement methods and means.

The thermal efficiency of a power plant is increased by employing heat exchanger 164 for transferring heat between the steam condensate directed to re-injection well 152, and the organic fluid (pentane) condensate produced by condenser 163

In the preferred embodiment of the present invention described in relation to FIG. 2A, the flow of geothermal fluid extracted from production well 151 in controlled by plant pressure control valve 156 positioned at the well head. The operation of plant well head pressure control valve 156 is controlled by central station controller 184 for maintaining a preset value of at least one parameter or quantity that characterizes the flow, e.g., the pressure of the geothermal steam monitored by sensor 180 at the input to the geothermal plant. This parameter is set at a safe level lower than the maximum permitted value. In addition, preferably, the operation of plant pressure control valve 156 is controlled by another parameter or value, e.g., the pressure of the geothermal fluid at the injection well monitored by sensor 187. Here also, the valve is controlled by the controller in order to maintain the injection pressure at a value at or below a preset value which also is set at a safe value below the its maximum permitted value.

In operation, when the pressure of the geothermal steam at the input to the geothermal power plant or the pressure of the geothermal fluid at the injection well exceeds its preset value, central station controller 184 operates to bring about a reduction in flow of the geothermal fluid extracted from the production well by applying a control signal to plant pressure control valve 156. In addition, preferably the operation of the geothermal power plant is monitored by a remote monitoring system comprising sensors sensing pressures, temperatures, etc., computer display monitors (shown schematically by reference numeral 186), etc.

By using the above described preferred embodiment of the present invention, the geothermal plant system is maintained in operation and the possibility is substantially eliminated of the geothermal plant system or portion thereof going off-line when the values of the quantities rises above their preset values into a region of non-permissible values. Moreover, controller 184 can be used to increase the pressure of these two quantities if both the pressures drop below their respective preset values by applying a control signal that increases the flow of geothermal fluid through valve 156.

While the above description of the preferred embodiment of the present invention refers to plant pressure control valve 156 positioned at the well head of the geothermal production well, this aspect of the present invention can be used on other control valves and instrumentation, present in the geothermal plant system as shown in FIG. 2B for example.

In the present embodiment described in relation to FIGS. 2, 2A, and 2B, combining condensate and to a lesser extent non-condensable gases with the geothermal liquid being piped for reinjection into well 80 of well 152 brings about a reduction in the amount of mineral precipitation from the brines in the conduits leading to the reinjection well as well as in the well itself. This is primarily due to the low pH of the condensate, e.g. about 3–5. Such an effect is beneficial in reducing the fouling by precipitates, primarily silica, of the various piping and other components associated with the injection of fluid into the reinjection well.

In addition, when steam condensate is used for preheating the organic fluid as disclosed with reference to FIG. 2A, the resulting lower temperature of the steam condensate exiting preheater 164 is advantageous because the non-condensable gases will be more soluble.

While in the embodiment disclosed in relation to FIG. 2, brine exiting separator 53 is used to preheat organic fluid in the organic Rankine cycle turbines, the brine can merely be reinjected into a reinjection well without preheating the organic fluid with condensate and noncondensable gases being combined therewith to also reduce such mineral precipitation. Moreover while in the present embodiment, a separator and dehumidifier are provided, the present invention is also applicable to situations where the nature of the geothermal source or steam is such that devices of this kind are not necessary.

Figure 3:
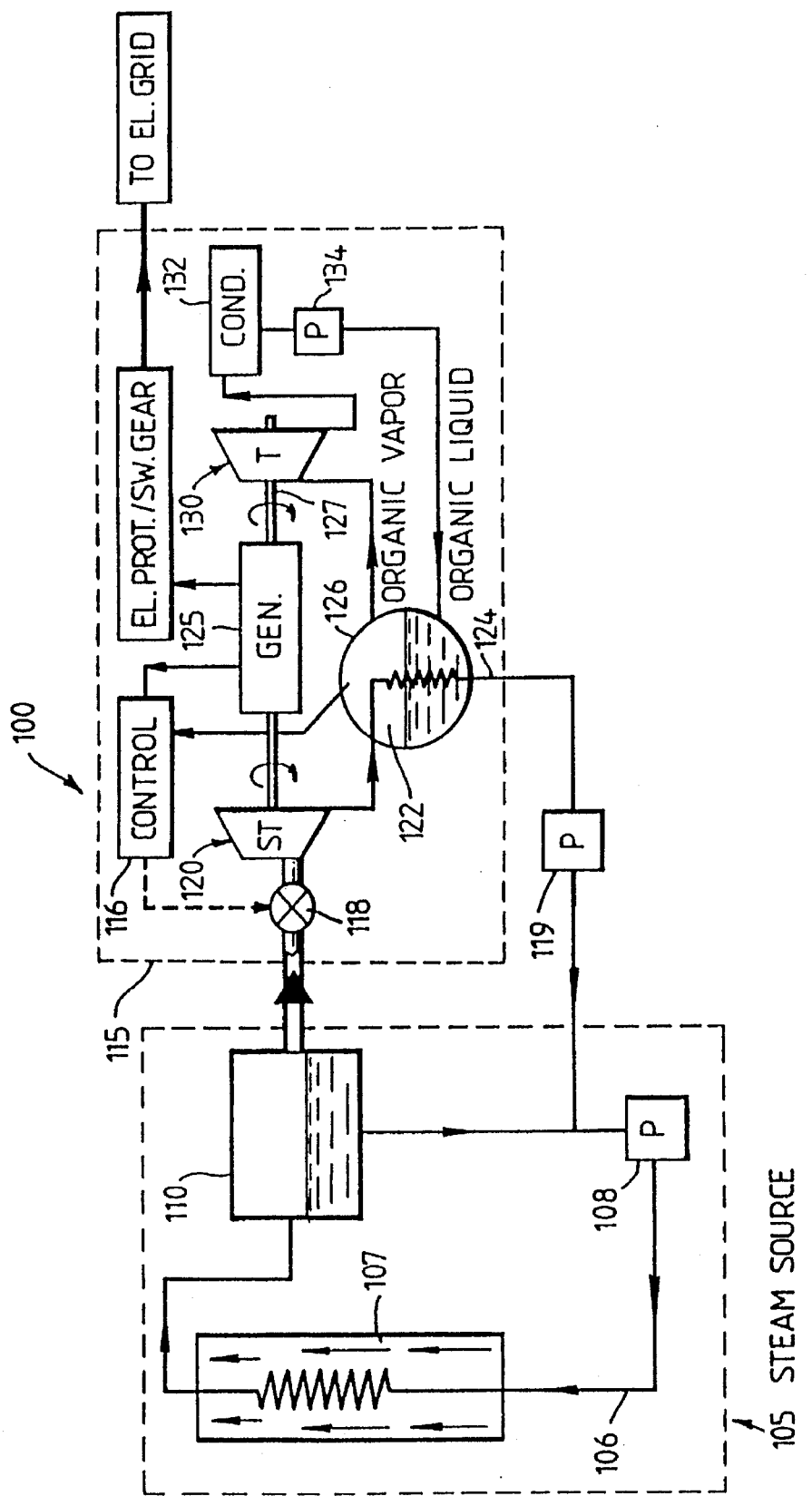
FIG. 3 shows a schematic of an embodiment of the present invention.

While the embodiments described in reference to FIGS. 2, 2A, and 2B refer to the use of geothermal steam, the present invention is also suitable for use with other heat sources such as industrial fluids and steam, solar ponds and waste heat from industrial processes for example flue gases where if necessary an intermediate heat exchanger may be incorporated for transferring heat obtained from the source to the power plant unit module by generating steam. An example of such a use is shown in FIG. 3, wherein steam is generated from steam source 105 comprising heat source 107, in the form of hot flue gases, pressurized water circuit 106 having pump 108 and flash chamber 110 for producing steam. The integrated power plant module unit 115 comprising steam turbine 120 and closed organic Rankine cycle turbine 130 basically operates in a similar manner to one of the modules described above with reference to FIG. 2 except that here no means for treating non-condensable gases are provided as, normally, no such gases are present.

Steam condenser 122 also preferably operates at pressures no less than atmospheric pressure. Also booster pump 119 is provided for raising the pressure of liquid water condensate exiting steam condenser 122 and permitting it to flow into pressurized water circuit 106. If preferred, booster pump 119 can be an ejector pump, using the high pressure of liquid flowing in the pressurized water circuit. Use of the integrated power plant module in combination with the steam source shown in FIG. 3, which may be termed a pressurized water recuperator, permits efficient and economical conversion of heat to electricity due mainly to the high temperatures of the steam exiting the outlet of flash chamber 110 and entering steam turbine 120. Furthermore, In the present embodiment, the use of a superheater is avoided. Moreover, use of an organic fluid in portion of the power plant with such types of heat sources is distinctly advantageous due to their thermodynamic properties, for example their relatively low boiling temperature, the minimal wetness of vapors achieved in expansion at the vapor turbines and also the relatively high preheat (i.e. the ratio of the amount of heat per unit time required to raise the temperature of the organic working liquid from the condenser temperature to the vaporization temperature, remaining in liquid form, to the total amount of heat per unit time required to evaporate the working fluid) levels obtained when using appropriate organic fluids. The use of the present invention can be particularly beneficial in situations where the use of apparatus containing flammable materials is forbidden. In such cases, the steam turbine portion of the unit module cam be located in the forbidden areas permitting electric power to be produced even in such situations.

It is believed that the advantages and improved results furnished by the method and apparatus of the present invention are apparent from the foregoing description of the preferred embodiments of the invention. Various changes and modifications may be made without departing from the spirit and the scope of the invention as described in the claims that follow.

What is claimed is:

1. A method for controlling the operation of a valve regulating the flow of geothermal fluid comprising geothermal brine and steam through the valve, said valve supplying the fluid to a geothermal plant, said method comprising the steps of:
    (a) determining the maximum permitted value of at least one quantity effecting the operation of the geothermal plant;
    (b) setting a preset value for said at least one quantity less than the maximum value of the quantity; and
    (c) reducing the flow of fluid through the valve when the value of said at least one quantity reaches its preset value for maintaining the operation of the geothermal plant; and
    (d) wherein said valve is a pressure control valve positioned at the head of a production well for controlling the flow of geothermal fluid from the well to the geothermal plant.

2. A method for controlling the operation of a valve regulating the flow of geothermal fluid comprising geothermal brine and steam through the valve, said valve supplying the fluid to a geothermal plant, said method comprising the steps of:
    (a) determining the maximum permitted value of at least one quantity effecting the operation of the geothermal plant;
    (b) setting preset value for said at least one quantity less than the maximum value of the quantity; and
    (c) reducing the flow of fluid through the valve when the value or said at least one quantity reaches its preset value for maintaining the operation of the geothermal plant; and
    (d) including separating the geothermal fluid into geothermal brine and steam and supplying the steam to said geothermal plant.

3. A method according to claim 2 wherein said quantity is the pressure of the geothermal steam at the input into the geothermal plant.

4. A method for controlling the operation of a valve regulating the flow of geothermal fluid comprising geothermal brine and steam through the valve, said valve supplying the fluid to a geothermal plant, said method comprising the steps of:
    (a) determining the maximum permitted value of at least one quantity effecting the operation of the geothermal plant;
    (b) setting preset value for said at least one quantity less than the maximum value of the quantity; and
    (c) reducing the flow of fluid through the valve when the value of said at least one quantity reaches its preset value for maintaining the operation of the geothermal plant; and
    (d) wherein said quantity is the pressure of the geothermal fluid at an injection well where the geothermal fluid is injected.

5. A geothermal power plant operating on geothermal fluid derived from a production well, said plant comprising:
    a) a plant pressure control valve for controlling the flow of said fluid from the production well to said geothermal plant;
    b) a central controller for controlling the setting of said valve;
    c) means responsive to at least one parameter of said power plant which affects the operation of the power plant for producing a control signal, said parameter having a maximum permitted value;
    d) means for applying said control signal to said central controller;
    e) means for applying to said central controller a preset value that represents less than the maximum value of the quantity; and
    d) said central controller being operational to reduce the flow of fluid through said plant pressure control valve when the value of said at least one parameter reaches its preset value for maintaining the operation of the geothermal plant.

6. A geothermal power plant according to claim 5 wherein said one parameter is the pressure downstream of said plant pressure control valve.

7. A geothermal power plant according to claim 5 including means for supplying geothermal fluid from said plant to a re-injection well, and wherein said one parameter is the pressure of said geothermal fluid at said re-injection well.

8. A geothermal power plant according to claim 5 wherein said plant includes a separator for separating said geothermal fluid into steam and brine, a steam turbine responsive to said steam for generating power and producing expanded steam, a heat exchanger containing organic fluid for condensing said expanded steam into condensate and producing vaporized organic fluid, and organic vapor turbine responsive to said vaporized organic fluid for generating power and producing expanded organic vapor, a condenser for condensing said expanded organic vapor into organic liquid, means for returning said organic liquid to said heat exchanger, a steam sensor located between said pressure control valve and said plant for sensing the pressure of said steam, said central controller being operative to reduce the flow of geothermal fluid through said pressure control valve when said steam sensor senses a pressure greater than a predetermined value.

9. A geothermal power plant according to claim 8 including means for supplying steam condensate and said brine as a mixture to a re-injection well, a mixture sensor for sensing the pressure of said mixture, said central controller being operative to reduce the flow of said steam through said pressure control valve when said mixture sensor senses a pressure greater than a predetermined value.

10. A geothermal power plant according to claim 8 including a by-pass line in parallel with said steam turbine, and a by-pass valve in said by-pass line for controlling the flow therethrough, and sensors for sensing the back pressure on said steam turbine and said heat exchanger, said central controller being operative to control the operation of said by-pass valve in accordance with the sensed back pressure on said steam turbine and said heat exchanger.

11. A geothermal power plant according to claim 8 including a by-pass line in parallel with said organic turbine, and a by-pass valve in said by-pass line for controlling the flow therethrough, and sensors for sensing the back pressure on said organic turbine and said condenser, said central controller being operative to control the operation of said by-pass valve in accordance with the sensed back pressure on said organic turbine and said condenser.

* * * * *